United States Patent [19]

Tamura

[11] Patent Number: 4,959,999
[45] Date of Patent: Oct. 2, 1990

[54] VACUUM GAUGE OF THERMO-CONDUCTIVE TYPE WITH QUARTZ OSCILLATOR

[75] Inventor: Fujio Tamura, Sendai, Japan

[73] Assignee: Seiko Electronic Components Ltd., Japan

[21] Appl. No.: 311,618

[22] Filed: Feb. 15, 1989

[51] Int. Cl.$^5$ .......................................... G01L 21/12
[52] U.S. Cl. ............................................... 73/755
[58] Field of Search ........................ 73/755, 702, 704

[56] References Cited

U.S. PATENT DOCUMENTS 4,638,664  1/1987  Tamura ............................. 73/702

FOREIGN PATENT DOCUMENTS 0847099  7/1981  U.S.S.R. ............................. 73/755

Primary Examiner—Donald O. Woodiel
Attorney, Agent, or Firm—Bruce L. Adams; Van C. Wilks

[57] ABSTRACT

A pressure or vacuum gauge measures pressure of gas within a chamber. A quartz oscillator is disposed within the chamber for undergoing oscillation having a frequency dependent on a body temperature thereof. A constant heat source is disposed in spaced relation to or directly on the temperature-dependent quartz oscillator for heating the same to hold the body temperature thereof which is dependent on the pressure of surrounding gas. The oscillating frequency of the quartz oscillator is converted into a signal indicative of the pressure of the gas.

19 Claims, 4 Drawing Sheets

# VACUUM GAUGE OF THERMO-CONDUCTIVE TYPE WITH QUARTZ OSCILLATOR

BACKGROUND OF THE INVENTION

The present invention relates to a gas pressure gauge or a vacuum gauge used broadly in vacuum devices and instruments, and more specifically relates to a vacuum gauge of the thermo-conductive type utilizing a temperature dependant quartz oscillator operative based on the fact that the thermo-conductivity of gas is a function of its pressure or degree of its density.

A thermo-conductive type vacuum gauge such as a Pirani gauge has been generally used for the pressure measurement in intermediate and low pressure range ($10^{-3}-1$ torr). FIG. 2 shows an example of the conventional vacuum gauge of the thermo-conductive type with digital display. One resistive element of a bridge circuit is composed of a filament 11 which is disposed within a vacuum chamber and operates as a gas pressure sensor. The other resistive elements 11a, 11b and 11c of the bridge circuit are disposed outside the vacuum chamber, and a DC power source 12 applies a constant DC voltage to the bridge circuit. The equilibrium voltage of the bridge circuit is amplified by a DC amplifier 13, and the amplified DC voltage is converted into a corresponding digital signal by an analog-to-digital converter 14 (A/D converter). A counter 15 counts the output signal of A/D converter 14 to produce an address signal for a subsequent read-only-memory 16 (ROM). The ROM 16 feeds to a decoder 17 a display signal (i.e., the signal indicative of the value of gas pressure) corresponding to the output signal of the counter 15 (i.e., the signal representative of gas pressure information), and the decoder 17 decodes the display signal so that a subsequent display device 18 (for example, a seven-digit LED display device) can display the value of gas pressure. The logic system from the A/D converter to the decoder is controlled by a clock signal which is fed from a clock generater 19 having an oscillating source in the form of a quartz oscillator 20.

In operation, if the pressure within the vacuum chamber decreases, the heat dissipating from the filament 11 decreases to increase the temperature of the filament 11 and therefore to increase the electric resistance of the filament so that the equilibrium voltage of the bridge circuit is increased. As described above, the equilibrium voltage of the bridge circuit is a function of the gas pressure within the vacuum chamber, hence the pressure within the vacuum chamber can be detected by measuring the equilibrium voltage of the bridge circuit.

Though the conventional vacuum gauge of the thermoconductive type can be conveniently and widely used to measure the gas pressure in the intermediate and low pressure ranges, it has the following drawbacks. 1. Since the drift of a DC amplifier would directly cause a measurement error, a highly stable (and therefore expensive) DC amplifier is required. 2. An expensive A/D converter is required for the digital display of the measurement result. 3. Since the filament generates increasingly more heat as the gas pressure decreases, the pressure sensor deteriorates through use.

As described above, the conventional vacuum gauge of the thermo-conductive type has drawbacks such as the need for a high grade DC amplifier and the need for an expensive A/D converter in case of the digital display of the measurement result, both of which increase the cost of the vacuum gauge, and the deterioration of the pressure sensor.

SUMMARY OF THE INVENTION

An object of the present invention is to provide a new compact, reliable and inexpensive vacuum gauge of the thermoconductive type.

Another object of the present invention is to provide a new vacuum gauge of the thermo-conductive type utilizing a temperature-dependent quartz oscillator for measuring the gas pressure in terms of its oscillating frequency which is a function of its body temperature which depends on the thermal conductivity of the surrounding gas which is proportional to the gas pressure.

A further object of the present invention is to provide a new tuning fork quartz oscillator suitable for use in the inventive vacuum gauge.

In order to achieve the above objects, according to the present invention, a quartz oscillator is disposed within a vacuum chamber for undergoing oscillation at a frequency dependent on a body temperature thereof. A constant heat source is disposed in spaced relation to or directly on the temperature-dependent quartz oscillator for heating the same to hold the body temperature thereof at a certain degree which is dependent, on the pressure of the surrounding gas within the chamber. The oscillating frequency of the quartz oscillator is converted into a signal indicative of the gas pressure.

DESCRIPTION OF THE PREFERRED EMBODIMENTS

Figure 1:
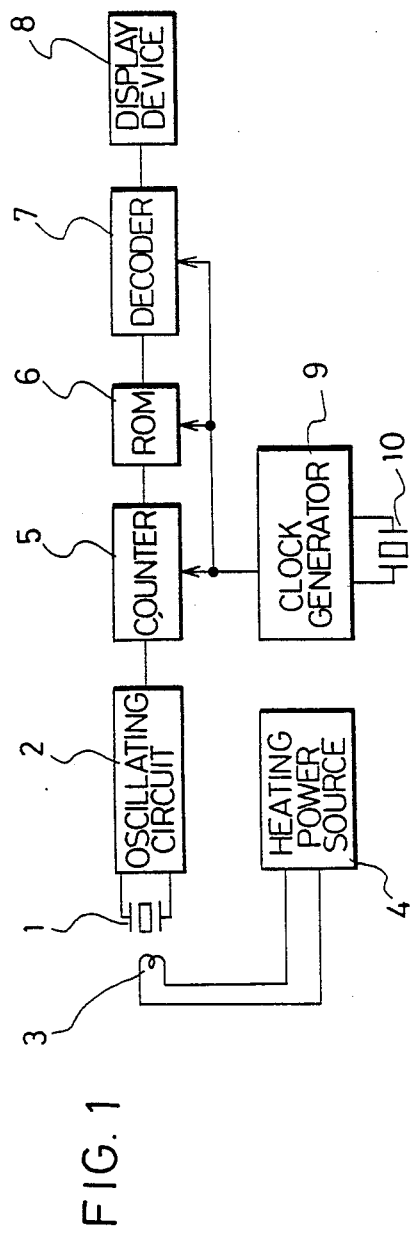
FIG. 1 is a circuit block diagram showing a vacuum gauge according to the present invention.
Figure 2:
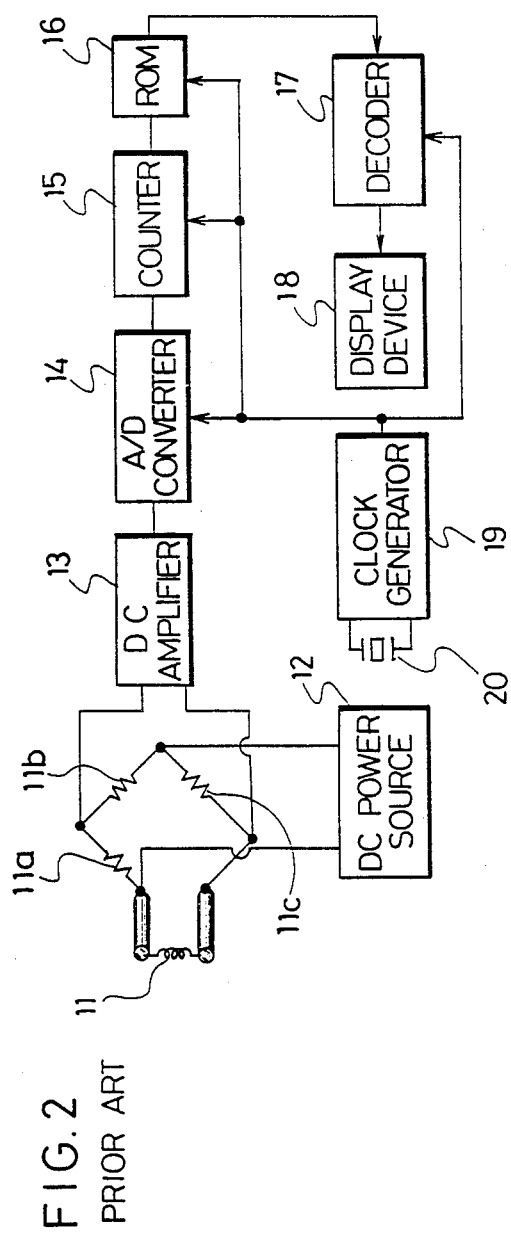
FIG. 2 is a circuit block diagram showing the conventional Pirani vacuum gauge.
Figure 3:
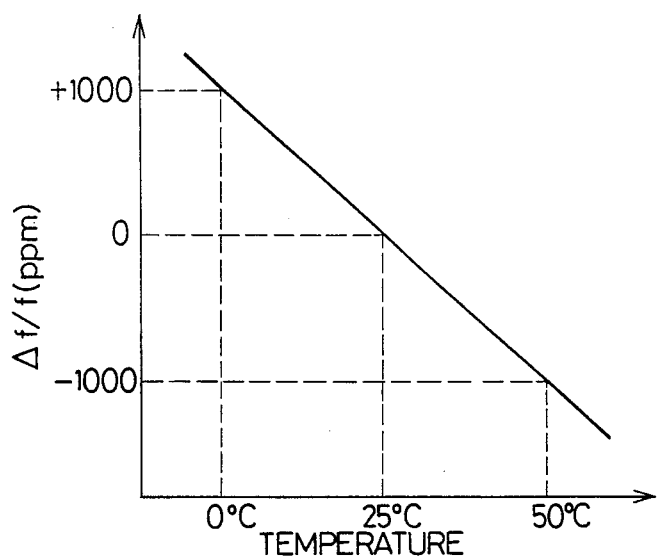
FIG. 3 is a diagram showing the relation between oscillating frequency and body temperature of a quartz oscillator used in the inventive vacuum gauge.

Hereinafter, embodiments of the present invention will be described in conjunction with the drawings. FIG. 1 is a circuit block diagram showing one embodiment of the present invention. The vacuum gauge has a temperature dependent quartz oscillator 1, the oscillating output frequency of which changes in response to the ambient temperature as shown in FIG. 3. An oscillating circuit 2 (of the selfoscillating type) drives the quartz oscillator 1 and is normally comprised of a simple non-regulative oscillating circuit such as Colpitts circuit composed of a CMOS inverter. A filament 3 is disposed an appropriate distance from the quartz oscillator 1 to heat the same. A heating power source 4 feeds a constant electric power to the filament 3 to enable the filament 3 to generate heat at a given constant rate. The pair of temperature-dependent quartz oscillator 1 and filament 3 are disposed within a vacuum chamber (not shown).

When the gas pressure within the vacuum chamber is reduced and the gas density is decreased, the heat amount of heat transmitted from the filament to the quartz oscillator through the gas medium is reduced to decrease the temperature of the quartz oscillator body to thereby increase the oscillating frequency thereof. On the other hand, when the gas pressure increases within the vacuum chamber and therefore the gas density increases, the transmitted amount of heat through the gas medium is increased to increase the temperature of the quartz oscillator body to thereby decrease the oscillating frequency of the quartz oscillator.

Figure 4:
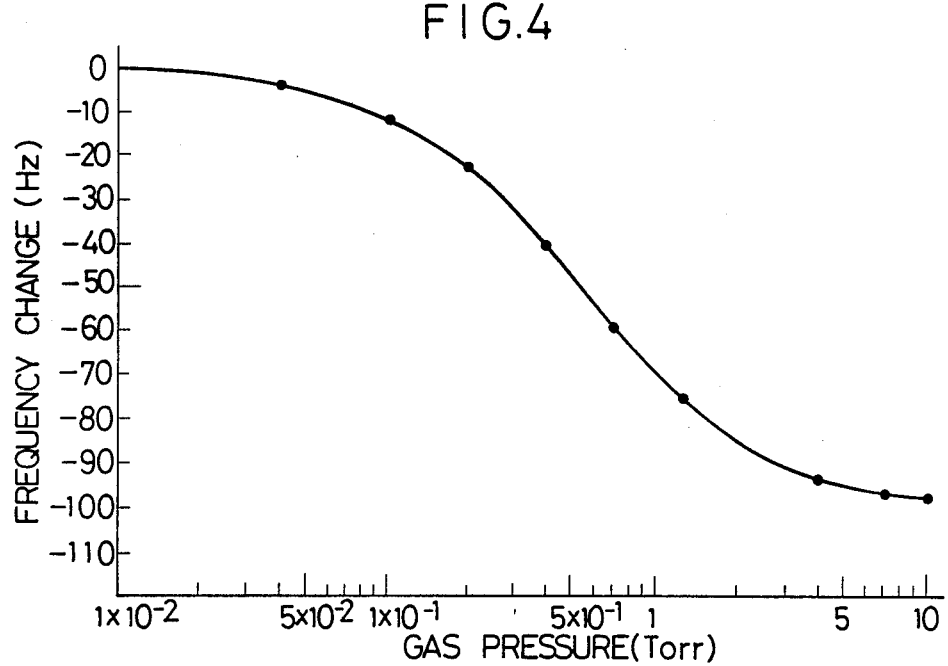
FIG. 4 is a diagram showing the relation between the oscillation frequency of a quartz oscillator and the measured gas pressure/according to the inventive vacuum gauge.

As described above, the temperature of the filament, the dimension of the quartz oscillator and the mutual position between the filament and quartz oscillator should be precisely determined so that the gas pressure within the vacuum chamber can be precisely measured in terms of the change of oscillating frequency of the quartz oscillator. FIG. 4 shows the relationship between the gas pressure and the oscillating frequency of the quartz oscillator.

In this embodiment, the temperature-dependent quartz oscillator 1 is comprised of a tuning fork type quartz oscillator having a standard frequency of 33 KHz. The logic system in this embodiment operates in a manner similar to the conventional vacuum gauge. In the FIG. 1 embodiment, the oscillating frequency of the output signal from the oscillating circuit 2 is counted by a counter 5, and the output of counter 5 is effective to designate an address of a ROM 6. The output signal from the ROM 6 which is stored in the designated address is a binary-coded signal representative of the measured value of gas pressure. A decoder 7 decodes the binary-coded signal and applies the decoded signal to a display device 8 composed of seven digits to enable the display device 8 to display the measured value of gas pressure. A clock generator 9 applies a clock signal to the counter 5, the ROM 6 and the decoder 7, and has a quartz oscillator 10 comprised of an AT cut quartz oscillator having a specific frequency of 4.19 MHz.

According to the present invention, since the temperature change due to the gas pressure change is detected in terms of the oscillating frequency change of the quartz oscillator, the digital signal representative of the gas pressure can be obtained by a considerably simple circuit structure. Consequently, the present invention can provide a new vacuum gauge of the thermo-conductive type at a considerably low price without an expensive DC amplifier and an A/D converter which would be needed in the conventional vacuum gauge.

Further, the present invention has more advantages such as the gas pressure can be stably detected, because the variation of the oscillating frequency of the quartz oscillator due to aging effect is very small, and the relationship between the gas pressure and oscillating frequency change is not substantially affected due to a tiny accumulation on the oscillator.

Figure 5:
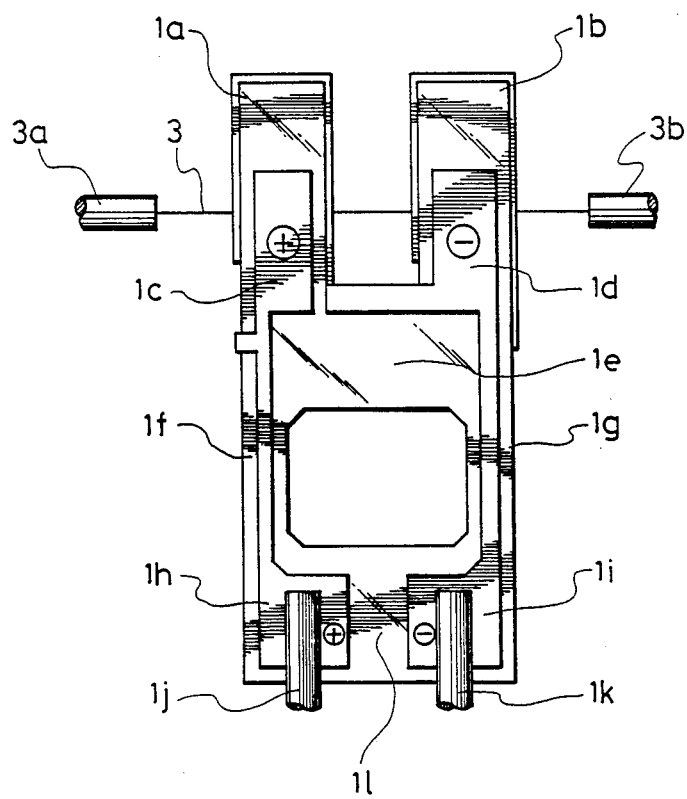
FIG. 5 is a front plan view of a quartz oscillator used in the inventive vacuum gauge.

FIG. 5 is a plan view of a temperature dependent quartz oscillator used in the inventive vacuum gauge. The oscillator 1 has a tuning fork shape and a specific oscillating frequency of about 33 KHz. The oscillator is comprised of a pair of leg or oscillating portions 1a and 1b, and a pair of electrodes 1c and 1d for applying electric fields effective to drive the respective oscillating portions 1a and 1b. As shown in FIG. 5, each electrode is formed on the front and side faces of the corresponding oscillating portion. By such arrangement of the electrodes, the quartz oscillator undergoes flexural oscillation at its oscillating portions according to the well known principle. The electrodes 1c and 1d are connected to corresponding electrode lead members 1j and 1k, respectively, through electrode pads 1h and 1i which are formed on a supporting portion 1l of the oscillator 1. The temperature-dependent quartz oscillator is supported vertically by means of the electrode lead members 1j and 1k. The oscillator 1 is comprised also of a base portion 1e of the tuning fork shape which connects the oscillating portions to each other. In the conventional tuning fork quartz oscillator, the electrode pads 1h and 1i would be disposed on the base portion 1e. However, in the temperature-dependent quartz oscillator 1 according to the present invention, the base portion 1e and the supporting portion 1l are mechanically connected to each other through a pair of narrow connecting portions 1f and 1g. The narrow connecting portions 1f and 1g are formed by etching process during the shaping of the tuning fork quartz oscillator. A heating source which is actually a filament 3 is disposed adjacent to the oscillator 1. The heating source is supported by a pair of supporting members 3a and 3b a predetermined distance from the temperature-dependent quartz oscillator 1 so as to apply heat to the quartz oscillator.

In operation, when Q in (P) represents a heat amount transmitted from the heat source to the quartz oscillator body where P indicates gas pressure and Q in (P) is proportional to P, and Q out represents the heat amount dissipated from the quartz oscillator through the electrode lead members thereof, the heat amount $\Delta Q$ accumulated in the quartz oscillator is determined according to the following relation.

$$\Delta Q = Q \text{ in } (P) - Q \text{ out} \quad (1)$$

When the specific heat of the temperature-dependent quartz oscillator is represented by c, and the mass thereof is represented by m, the temperature change $\Delta T$ of the quartz oscillator body due to the accumulated heat amount $\Delta Q$ is determined according to the following relation.

$$\Delta T = \Delta Q/mc \quad (2)$$

The oscillating frequency change $\Delta f$ of the temperature-dependent quartz oscillator due to the body temperature change $\Delta T$ thereof is represented by the following relation where $\alpha$ indicates the temperature coefficient of temperature-dependent quartz oscillator.

$$\Delta f = -\alpha \Delta T = -\alpha \Delta Q/mc \quad (3)$$

In order to increase the sensitivity, i.e., to increase $\Delta f$, $\Delta Q$ should be increased and m should be decreased (which means reducing the size of the quartz oscillator) according to the relation (3) whereas $\alpha$ and c are constant values specific to quartz. In order to increase $\Delta Q$, Q in should be increased or Q out should be decreased. Q in is the heat amount fed from the filament 3 to the quartz oscillator 1 due to thermal conduction through the gas medium and therefore is proportional to the gas pressure. On the other hand, Q out is the heat amount dissipated from the quartz oscillator body through the electrode lead members 1j and 1k thereof and is irrespective of the pressure of gas medium. Consequently, in order to increase the pressure sensitivity of the quartz oscillator in the low gas pressure range, the dissipating heat amount Q out must be reduced as much as possible. Namely, according to the present invention, the narrow connecting portions 1f and 1g of the quartz oscillator are provided to prevent the heat amount fed from the heat source 3 from transmitting through the electrode lead members 1j and 1k as much as possible. Since the heat amount transmitting through the connecting portions is proportional to the cross section of the connecting portions and inversely proportional to the length thereof, the width of connecting portions 1j and 1k is reduced as narrow as possible and the length thereof is elongated to reduce the dissipating heat amount Q out at minimum to thereby increase the pressure sensitivity in the low gas pressure range. The provision of the connecting portions 1f and 1g enables the easy measurement of gas pressure in the range of $1 \times 10^{-3}$ torr. In addition, the connecting portions are formed by the photo-etching technology concurrently during the shaping process of the tuning fork quartz oscillator element without an additional fabrication step.

However, when the heat source is disposed in spaced relation to the quartz oscillator, the vacuum gauge may cause the following drawbacks.

1. Since the heating source and the quartz temperature sensor are disposed in spaced relation from each other, heat dissipation is great, thereby increasing the heating power and the size of the gauge.
2. Even if the distance between the heat source and the quartz temperature sensor is slightly changed, the heat amount transmitted to the sensor is changed, and the sensitivity is also changed.
3. It is difficult to reduce the dimension of the sensor portion.

Figure 6A:
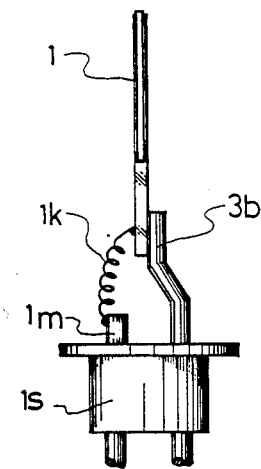
FIGS. 6A, 6B and 6C are side, front and rear views, respectively, of another quartz oscillator used in the inventive vacuum gauge.
Figure 6B:
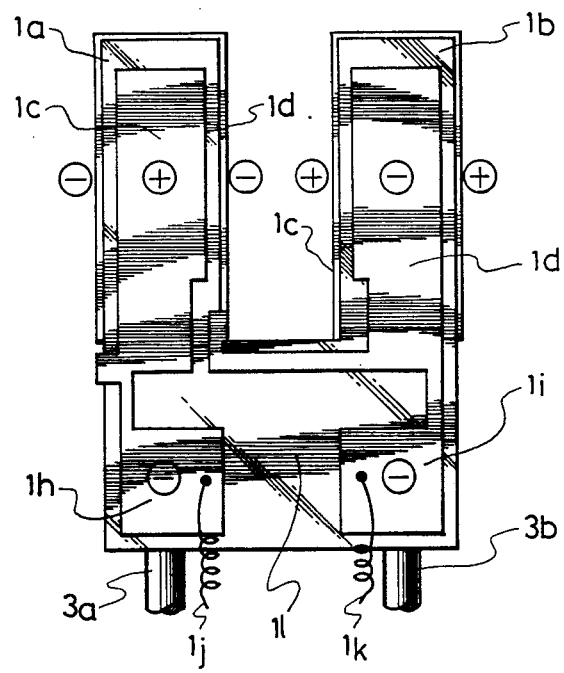
Figure 6C:
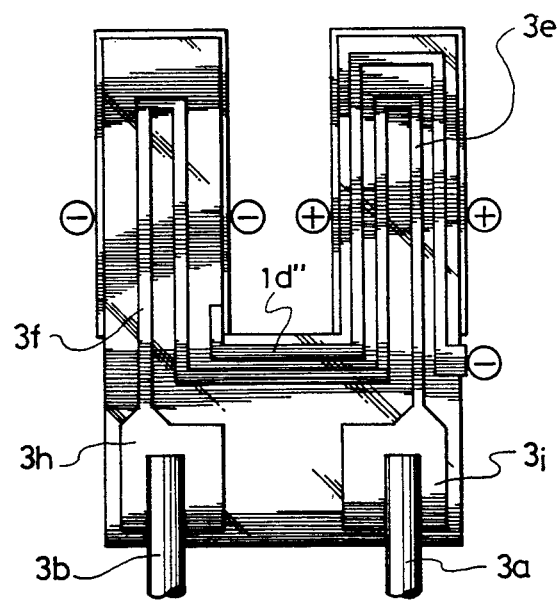

In view of this, there is proposed another type of quartz oscillator integrated with a heat source. FIGS. 6A, 6B and 6C show such type of quartz oscillator. The temperature-dependent tuning fork quartz oscillator is comprised of a temperature-dependent quartz oscillator 1 having the temperature dependency shown in FIG. 3, and a pair of lead members 3a and 3b which are supported by a stem 1s. A pair of fine lead wires 1j and 1k are connected to another pair of lead members 1m and 1n, respectively, which are supported by the stem 1s. FIG. 6B is a front view showing a front face or one of the major faces of the temperature-dependent quartz oscillator 1, which is comprised of a pair of oscillating leg portions 1a and 1b, and a pair of electrodes 1c and 1d formed, as shown in the figure, on the major and side faces of the oscillating portions 1a and 1b for producing electric fields effective to drive the oscillating portions. By such arrangement of the electrodes, the oscillating portions undergo flexural oscillation according to the known principle. The electrodes 1c and 1d are connected to the fine lead wires 1j and 1k, respectively, through a pair of electrode pads 1h and 1i formed on a supporting portion 1l of the oscillator 1. FIG. 6C is a rear view of the temperature-dependent quartz oscillator 1 showing the other major face. A pair of fine thermoelectric members 3e and 3f formed of, for example, chromium thin film of about 500Å or other thermoelectric materials are disposed on the rear faces of oscillating portions 1a and 1b. The pair of thermoelectric members 3e and 3f are electrically and mechanically connected to the corresponding lead members 3a and 3b through a pair of heating pad 3h and 3i (by using high-melting-point solder). A constant DC voltage is applied between the lead members 3a and 3b so that the thermoelectric members 3e and 3f which are connected in series to each other produce heat (produced heat amount is represented by QW) so as to heat the quartz oscillator. The heat amount dissipated from the quartz oscillator is the sum of the heat amount QM dissipated from the surface of the quartz oscillator into the surrounding gas medium and the heat amount QL dissipated through the lead members. Therefore, the increased temperature $\Delta T$ of the temperature-dependent quartz oscillator is represented by the following relation:

$$\Delta T = (QW - QM - QL)/mc \qquad (1)$$

where m represents the mass of the quartz oscillator and c represents specific heat thereof. Since the dissipated heat amount QM is proportional to the pressure P of the surrounding gas, the temperature change $\Delta T$ is represented by the following relation:

$$\Delta T = (QW - QL - KP)/mc \qquad (2)$$

where K is constant. On the other hand, the oscillating frequency change $\Delta f$ of the temperature-dependent quartz oscillator is represented by the following relation:

$$\Delta f = -\alpha \Delta T + \beta \qquad (3)$$

where is the primary temperature coefficient of the quartz oscillator and $\beta$ is a constant. Consequently, the pressure P of the surrounding gas is detected according to the frequency change $\Delta f$ as indicated by the relations (2) and (3).

According to the present invention, by arranging the heat source in the form of thermoelectric films 3e and 3f integrally on the rear major face of temperature-dependent quartz oscillator 1, the following features are obtained.

1. Since there is no substantial loss of heat transfer from the heat source to the temperature-dependent quartz oscillator, the electric power for heating can be greatly saved.
2. Since the heat source and the temperature-dependent quartz oscillator are integral with each other, there is no need to adjust the distance therebetween, there is no substantial transient change of the transferred heat amount, and therefore a stable pressure measurement can be realized.
3. Since the heat source and the temperature-dependent quartz oscillator are integrated with each other, the efficiency of heat transfer from the heat source to the quartz oscillator is not changed in principle even if the temperature-dependent quartz oscillator is reduced in size, thereby achieving reduction of the size of the temperature-dependent quartz oscillator. Consequently, as understood from the relation (2), the sensitivity can be increased.

What is claimed is:

1. A pressure gauge for measuring the pressure of a gas within a chamber, comprising:
   oscillating means disposed within the chamber for undergoing oscillation at a frequency dependant on a body temperature thereof;
   heating means disposed adjacent to the oscillating means for heating the oscillating means to hold the body temperature thereof at a level which is dependant on the pressure of the gas;

displaying means for displaying the pressure of the gas according to the oscillation frequency of the oscillating means; and wherein the oscillating means comprises a temperature-dependent tuning fork quartz oscillator composed of a pair of opposed oscillating portions receptive of the heat transmitted from the heating mans, base portion connecting the pair of oscillating portions to each other, a supporting portion supporting the base portion within the chamber, and a connecting portion connected between the base and supporting portions for reducing the transfer of the heat from the base portion to the supporting portion.

2. A pressure gauge according to claim 1; wherein the heating means includes a heat source spaced a given distance from the oscillating means for transmitting through the medium of the gas a certain amount of heat dependent on the pressure of the gas to the oscillating means to thereby hold the body temperature thereof according to the pressure of the gas.

3. A pressure gauge according to claim 2; wherein the heat source comprises a filament for generating heat at a constant rate.

4. A pressure gauge according to claim 1; wherein the tuning fork quartz oscillator comprises a photo-etched quartz oscillator composed of integrated oscillating, base, connecting and supporting portions.

5. A pressure gauge for measuring the pressure of a gas within a chamber, comprising:
   oscillating means disposed within the chamber for undergoing oscillation at a frequency dependent on a body temperature thereof;
   heating means comprising a heat source integrated with the oscillating means for directly heating the oscillating means such that the body temperature thereof is held at a certain level according to heat dissipation from the surface thereof to the surrounding gas depending on the pressure of the gas; and
   displaying means for displaying the pressure of the gas according to the oscillation frequency of the oscillating means.

6. A pressure gauge according to claim 5; wherein the oscillating means includes a temperature-dependent quartz oscillator, and the heat source comprises a thermoelectric film formed on the quartz oscillator for generating heat at a constant rate.

7. A pressure gauge according to claim 6; wherein the quartz oscillator comprises a tuning fork oscillator having a pair of oscillating portions having a thermoelectric film formed thereon.

8. A pressure gauge according to claim 6; wherein the thermoelectric film comprises a chromium film.

9. A pressure gauge for measuring gas pressure comprising: oscillating means for producing a temperature-dependent frequency signal having an oscillation frequency which varies in dependent on the temperature of a surrounding gas; heating means affixed to the oscillating mean for applying heat energy thereto to maintain the oscillating means at a temperature which varies as a function of the pressure of the surrounding gas so that a change in gas pressure effects a change in the oscillation frequency; and means for measuring the oscillation frequency to produce an output signal representative of the measured gas pressure.

10. A pressure gauge according to claim 9; wherein the oscillating means comprises a temperature-dependent tuning fork having a base portion, and leg portions extending outwardly of the base portion for undergoing oscillation when the tuning fork is driven, and means for driving the tuning fork to effect oscillation of the leg portions.

11. A pressure gauge according to claim 10; wherein the heating means is disposed on the leg portions of the tuning fork.

12. A pressure gauge according to claim 11; wherein the heating means extends lengthwise along the leg portions of the tuning fork.

13. A pressure gauge according to claim 12; wherein the heating means comprises thermoelectric members affixed to the leg portions of the tuning fork, and means for flowing current through the thermoelectric members to produce heat energy.

14. A pressure gauge according to claim 13; wherein the thermoelectric members comprise films composed of thermoelectric material.

15. A pressure gauge according to claim 13; wherein the heating means includes heating pads affixed to the base portion of the tuning fork and electrically connected to the thermoelectric members.

16. A pressure gauge according to claim 11; wherein the means for measuring the oscillation frequency comprises a counter for counting the oscillation frequency and producing a corresponding count signal, memory means for storing at different address locations data representative of different gas pressure values and being addressable by the count signal to read out the addressed data, and means for converting the read-out data to an output signal representative of the measured gas pressure.

17. A pressure gauge according to claim 16; wherein the means for converting includes a display device for visually displaying the measured gas pressure.

18. A pressure gauge according to claim 9; wherein the mean for measuring the oscillation frequency comprises a counter for counting the oscillation frequency and producing a corresponding count signal, memory means for storing at different address locations data representative of the measured gas pressure. values and being addressable by the count signal to read out the addressed data, and means for converting the read-out data to an output signal representative of the measured gas pressure.

19. A pressure gauge according to claim 18; wherein the means for converting includes a display device for visually displaying the measured gas pressure.

* * * * *